US012333631B2

(12) United States Patent
Yuan et al.

(10) Patent No.: US 12,333,631 B2
(45) Date of Patent: Jun. 17, 2025

(54) COLORIZING X-RAY IMAGES (71) Applicant: Deere & Company, Moline, IL (US)

(72) Inventors: Zhiqiang Yuan, San Jose, CA (US); Elliott Grant, Woodside, CA (US)

(73) Assignee: Deere & Company, Moline, IL (US)

( * ) Notice: Subject to any disclaimer, the term of this patent is extended or adjusted under 35 U.S.C. 154(b) by 602 days.

(21) Appl. No.: 17/548,169

(22) Filed: Dec. 10, 2021

(65) Prior Publication Data

US 2023/0186529 A1 Jun. 15, 2023

(51) Int. Cl.
*G06T 11/00* (2006.01)
*G06T 7/60* (2017.01)
*G06T 7/90* (2017.01)

(52) U.S. Cl.
CPC .............. *G06T 11/001* (2013.01); *G06T 7/60* (2013.01); *G06T 7/90* (2017.01); *G06T 2207/10024* (2013.01); *G06T 2207/10116* (2013.01); *G06T 2207/20081* (2013.01); *G06T 2207/20084* (2013.01); *G06T 2207/30188* (2013.01)

(58) Field of Classification Search
CPC . G06T 11/001; G06T 7/60; G06T 7/90; G06T 2207/10024; G06T 2207/10116; G06T 2207/20081; G06T 2207/20084; G06T 2207/30188; G06T 7/62; G06T 7/0012
See application file for complete search history.

(56) References Cited

U.S. PATENT DOCUMENTS

| | | | | |
|---|---|---|---|---|
| 2020/0033274 A1* | 1/2020 | Couture | ............ | G01N 33/0098 |
| 2020/0077596 A1 | 3/2020 | Regan | | |
| 2020/0355829 A1* | 11/2020 | Redden | ................... | A01G 7/00 |
| 2024/0188507 A1* | 6/2024 | Call | ........................ | A01G 7/06 |

FOREIGN PATENT DOCUMENTS

CN 203069152 U 7/2013

OTHER PUBLICATIONS

L. Morra, "Bridging the gap between Natural and Medical Images through Deep Colorization," 2020 25th International Conference on Pattern Recognition (ICPR), Milan, Italy, 2021, pp. 835-842, doi: 10.1109/ICPR48806.2021.9412444; https://ieeexplore.ieee.org/document/9412444 (Year: 2021).*

(Continued)

*Primary Examiner* — Matthew C Bella
*Assistant Examiner* — Andrew B. Jones
(74) *Attorney, Agent, or Firm* — Hanley, Flight & Zimmerman, LLC (57) ABSTRACT

Implementations are described herein for colorizing an X-ray image and predicting one or more phenotypic traits about a plant based on the colorized X-ray image. In various implementations, an X-ray image that depicts a plant with a canopy of the plant partially occluding a part-of-interest is obtained, where the part-of-interest is visible through the canopy in the X-ray image. The X-ray images is colorized to predict one or more phenotypic traits of the part-of-interest. The colorization includes processing the X-ray image based on a machine learning model to generate a colorized version of the X-ray image, and predicting the one or more phenotypic traits based on one or more visual features of the colorized version of the X-ray image.

12 Claims, 5 Drawing Sheets

(56) References Cited

OTHER PUBLICATIONS

Hsiao, W.-T.; Kuo, W.-C.; Lin, H.-H.; Lai, L.-H. Assessment and Feasibility Study of Lemon Ripening Using X-ray Image of Information Visualization. Appl. Sci. 2021, 11, 3261. https://doi.org/10.3390/app11073261 https://www.mdpi.com/2076-3417/11/7/3261#B25-applsci-11-03261 (Year: 2021).*

Morra, L. et al., "Bridging the gap between Natural and Medical Images through Deep Colorization"; 25th IEEE International Conference on Pattern Recognition (ICPR); pp. 835-842; dated Jan. 10, 2021.

Pavaskar, A. et al., "Colorization of Grayscale Images Using Deep Learning"; International Academy of Science, Engineering and Technology, International Journal of Computer Science and Engineering (IJCSE), vol. 9, Issue 3; 8 pages; dated Apr. 1, 2020.

Pierre, F. et al., "Recent Approaches for Image Colorization: Mathematical Imaging and Vision" In "Handbook of Mathematical Models and Algorithms in Computer Vision and Imaging: Mathematical Imaging and Vision" Springer International Publishing; pp. 1-38; dated Jan. 1, 2021.

Li, Z. et al., "A review of computer vision technologies for plant phenotyping"; Computers and Electronics in Agriculture, Elsevier, vol. 176; 21 pages; dated Aug. 5, 2020.

European Patent Office; International Search Report and Written Opinion issued in Application No. PCT/US2022/052288; 11 pages; dated May 2, 2023.

Sathik et al., "Feature Extraction on Colored X-Ray Images by Bit-Plane Slicing Technique" International Journal of Engineering Science and Technology vol. 2(7), 2010, 2820-2824. 5 pages.

Hasnat et al., "A Proposed Grayscale Face Image Colorization System using Particle Swarm Optimization" International Journal of Virtual and Augmented Reality. vol. 1, Issue 1. Jan. 2017. 19 Pages.

Ying et al., "X2CT-GAN: Reconstructiong CT from Biplanar X-Rays with Generative Adversarial Networks" Computer Vision Foundation, IEEE. 10 pages.

Mustafa Haiderbhai "Generating Synthetic X-Rays Using Generative Adversarial Networks" Ottawa-Carleton Institute of Biomedical Engineering. 2020. 72 pages.

Venu et al., "Evaluation of Deep Convolutional Generative Adversarial Networks for Data Augmentation of Chest X-ray Images" Future Internet 2021, 13, 8. https://doi.org/10.3390/fi13010008. 13 pages.

Annie Brighty Christilin, "Study on Color Coding for X-ray Imagery for Security Control" International Journal for Research in Applied Science & Engineering Technology. ISSN: 2321-9653; IC Value: 45.98: SJ Impact Factor: 6.887. vol. 5 Issue XI Nov. 2017. 13 pages.

* cited by examiner

COLORIZING X-RAY IMAGES

BACKGROUND

Detection and classification of various plant attributes in digital imagery may have numerous applications. However, many plants (e.g. various melon plants, berry plants, etc.) develop a canopy of leaves that grow over the plants as they mature. This canopy may obscure one or more parts-of-interest of the plant, thus making traditional digital imagery less useful. X-ray imaging may allow for viewing one or more parts-of-interest through the canopy, but traditional X-ray images may also be of limited utility. Traditional X-ray images may be, in some instances, grainy monochrome depictions of the target. For example, in the case of a melon, an X-ray through the leaf canopy may simply appear as a generally plant-shape blob with considerable white noise.

SUMMARY

Implementations are described herein for colorizing an X-ray image taken through the canopy in order to be able to predict phenotypic trait(s) of the part-of-interest of the plant. This colorization may be performed by processing the X-ray image based on a machine learning model. In various implementations, the machine learning model may be trained so that the monochrome X-ray image of a plant, for example a melon, taken through a leaf canopy can be processed into a colorized version of the X-ray image.

The colorized image may, for example, provide information regarding the webbing, veins, seams, general coloration, etc. of the plant, each of which may provide information about the plant. For example, the placement of the veins, webbing, and/or seams may provide information on the ripeness (or lack thereof) of the plant. In some implementations, the machine learning model may be trained at least in part based on ground truth images captured after the canopy has been removed. This may allow the model to be trained based on a comparison of the colorized X-ray image to ground truth colored image of the plant. Other training methods may also be used, either alone or in combination with the training methods described herein.

In some implementations, a generative adversarial network ("GAN") may be employed to train a generator model to generate colorized X-ray images. To train the generator model, its output may be applied as input across a discriminator model of the GAN. The discriminator model may generate its own output classifying the generator model output as "real" or "synthetic." The discriminator model itself may be trained with a combination of ground truth digital images of real-world plants after the canopy is removed, as well as synthetic training images in the form of colorized X-ray images generated by the generator model. The discriminator and generator models may be trained in tandem until the discriminator model can no longer distinguish between ground truth images and those generated by the generator model.

When generating the colorized X-ray image, or predicting a phenotypic trait(s) of the plant based on the colorized X-ray image, a variety of other data points may also be taken into account. For example, one or more environmental features associated with an agricultural area where the plant(s) is grown, may be considered when generating the colorized X-ray image and/or predicting the phenotypic trait(s) of the plant. These environmental conditions may include, for instance, temperature, precipitation, sunlight exposure, fertilizer application, soil composition, pH levels, existing vegetation density in the area, or pesticide/herbicide application, to name a few. In some implementations, these environmental features may also include time-series data corresponding to the environmental condition(s).

In an aspect, a method can implemented using one or more processors, the method including: obtaining an X-ray image that depicts a plant, where a canopy of the plant at least partially occludes one or more plant-parts-of-interest from a vantage point at which an X-ray sensor captured the X-ray image, and where the one or more plant-parts-of-interest are visible through the canopy in the X-ray image; colorizing the X-ray image to predict one or more phenotypic traits of the one or more plant-parts-of-interest, where the colorizing includes: processing the X-ray image based on a machine learning model to generate a colorized version of the X-ray image, and predicting the one or more phenotypic traits based on one or more visual features of the colorized version of the X-ray image.

In some implementations, the machine learning model includes a generator model of a generative adversarial network that also includes a discriminator model.

In some implementations, the processing includes processing the X-ray image in conjunction with environmental data about a geographic area in which the plant is grown. In some implementations, the environmental data about the geographical area in which the plant is grown includes one or more of temperature, precipitation, sunlight exposure, fertilizer application, soil composition, pH levels, or pesticide application.

In some implementations, the plant comprises a melon plant with one or melons, and the one or more visual features comprise one or more spatial dimensions of seams of the one or more melons. In other implementations, the one or more plant-parts-of-interest include a berry portion of a berry plant.

In some implementations, predicting the one or more phenotypic traits is further based on one or more visual features of the canopy depicted in the X-ray image.

In another aspect, a method implemented using one or more processors includes: obtaining an X-ray image that depicts a plant, where a canopy of the plant at least partially occludes one or more plant-parts-of-interest from a vantage point at which an X-ray sensor captured the X-ray image, and where the one or more plant-parts-of-interest are visible through the canopy in the X-ray image; processing the X-ray image based on a generator machine learning model of a generative adversarial network to generate a colorized version of the X-ray image; processing the colorized version of the X-ray image based on a discriminator machine learning model of the generative adversarial network to generate a prediction of whether the colorized version of the X-ray image is genuine or synthetic; and training the generator machine learning model based on the prediction.

In some implementations, the method further includes: processing a ground truth image that depicts another plant based on the discriminator machine learning model of the generative adversarial network to generate a prediction of whether the ground truth image is genuine or synthetic; and training the discriminator machine learning model based on the prediction of whether the ground truth image is genuine or synthetic.

In some implementations, the method further comprises applying the discriminator machine learning model to a second X-ray image that depicts a plant, wherein a canopy of the plant at least partially occludes one or more plant-parts-of-interest from a vantage point at which an X-ray sensor captured the X-ray image, and wherein the one or more plant-parts-of-interest are visible through the canopy in the X-ray image to predict one or more phenotypic traits based on one or more visual features of the second X-ray image. In some other implementations, processing the X-ray image based on the generator machine learning model includes processing the X-ray image in conjunction with environmental data about a geographic area in which the plant is grown. In still other implementations, the environmental data about the geographical area in which the plant is grown includes one or more of temperature, precipitation, sunlight exposure, fertilizer application, soil composition, pH levels, or pesticide application.

In still another aspect, a system comprising one or more processors and memory storing instructions that, in response to execution of the instructions by the one or more processors, cause the one or more processors to: obtain an X-ray image that depicts a plant, where a canopy of the plant at least partially occludes one or more plant-parts-of-interest from a vantage point at which an X-ray sensor captured the X-ray image, and wherein the one or more plant-parts-of-interest are visible through the canopy in the X-ray image; colorize the X-ray image to predict one or more phenotypic traits of the one or more plant-parts-of-interest, which includes causing one or more processor to: process the X-ray image based on a machine learning model to generate a colorized version of the X-ray image, and predict the one or more phenotypic traits based on one or more visual features of the colorized version of the X-ray image.

In some implementations, the machine learning model comprises a generator model of a generative adversarial network that also includes a discriminator model.

In some implementations, the processing includes processing the X-ray image in conjunction with environmental data about a geographic area in which the plant is grown. In some such instances, the environmental data about the geographical area in which the plant is grown includes one or more of temperature, precipitation, sunlight exposure, fertilizer application, soil composition, pH levels, or pesticide application.

In some implementations, the plant includes a melon plant with one or more melons, and the one or more visual features comprise one or more spatial dimensions of seams of the one or more melons. In some other implementations, the one or more plant-parts-of-interest include a berry portion of a berry plant.

In some implementations, the one or more phenotypic traits are further predicted based on one or more visual features of the canopy depicted in the X-ray image.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
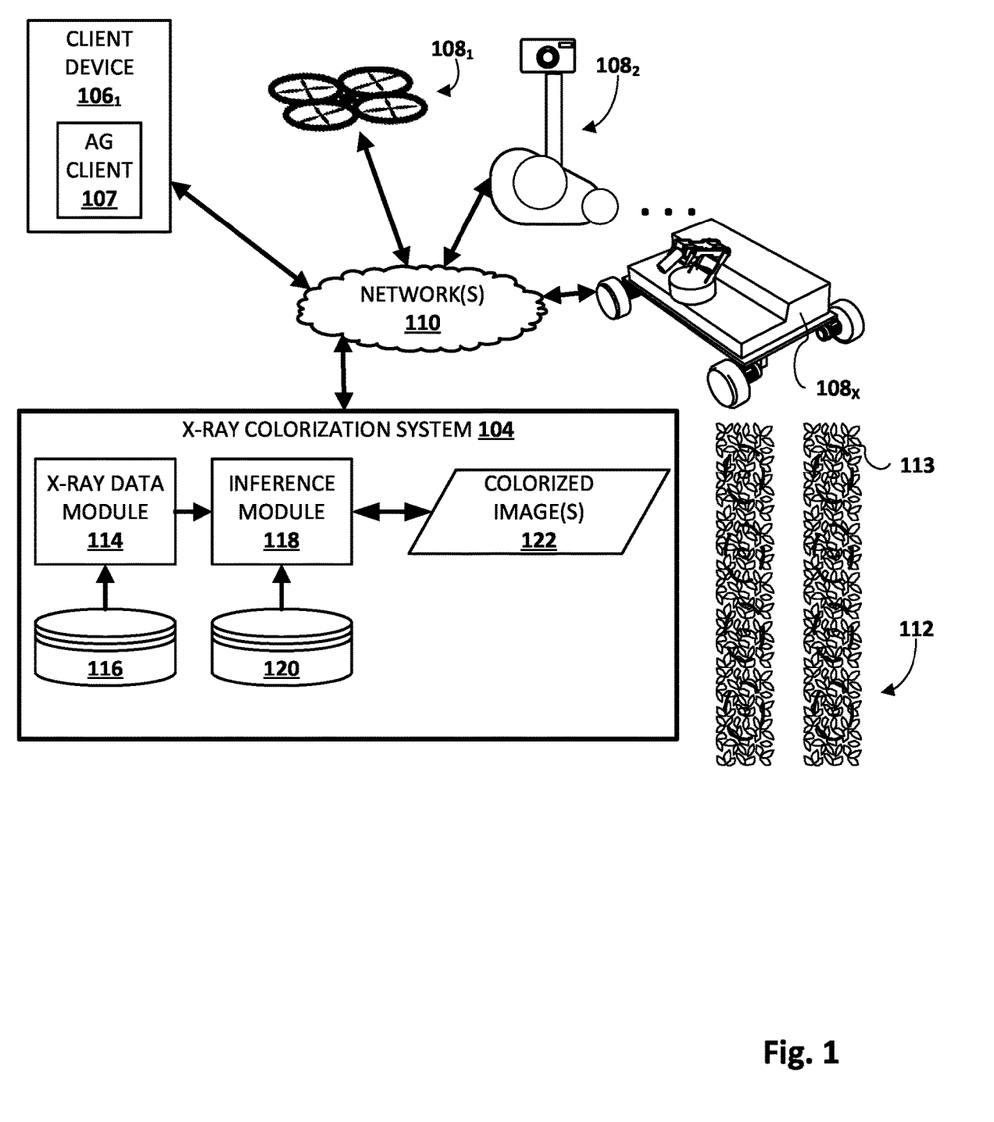
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes one or more agricultural areas 112, which may include crops that themselves include plant-portions-of-interest 113, and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more crop fields, one or more plots, one or more gardens, one or more greenhouses, or any other areas in which there may be an interest or desire to automatically detect, classify, and/or segment particular types of plants. As one non-limiting example, such as illustrated in FIG. 1, the plant-part-of-interest 113 may be a watermelon or other portion of a plant obscured by a plant canopy. Once located, an X-ray image of the plant (for example, through a leaf canopy obscuring the plant) may be taken by agricultural personnel and/or farming equipment.

An individual (which in the current context may also be referred to as a "user") may operate one or more client devices 106 to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

An X-ray colorization system 104 is an example of an information system in which the techniques described herein may be implemented. Each client device(s) 106, where present, and X-ray colorization system 104 may include one or more memories for storage of data and software applications, one or more processors for accessing data and executing applications, and other components that facilitate communication over a network. The operations performed by client device 106 and/or X-ray colorization system 104 may be distributed across multiple computer systems.

In some implementations, one or more robots 108 1-x may be deployed to perform image collection for use with machine learning model(s) trained on synthetic training data created using techniques described herein. An individual robot 108 1-x may take various forms, such as an unmanned aerial vehicle 108 1, a robot (not depicted) that is propelled along a wire, track, rail or other similar component that passes over and/or between crops, wheeled robots 108 2 to 108 x, or any other form of robot capable of being propelled or propelling itself past crops of interest and capturing images, for example X-ray image data captured via an X-ray sensor.

In some implementations, different robots may have different roles, e.g., depending on their capabilities. For example, in some implementations, one or more of robots 108 1-x may be designed to capture X-ray image data, others may be designed to manipulate plants or perform physical agricultural tasks, and/or others may do both. Robots 108 may include various types of sensors, such as X-ray sensors, vision sensors (e.g., 2D digital cameras, 3D cameras, 2.5D cameras, infrared cameras), inertial measurement unit ("IMU") sensors, Global Positioning System ("GPS") sensors, moisture sensors, lasers, barometers (for local weather information), photodiodes (e.g., for sunlight), thermometers, etc. In addition to by robots 108, X-ray images may be captured using other means, such as X-ray sensors mounted to agricultural equipment such as tractors, boom sprayers affixed to vehicles, center pivots, etc.

In various implementations, X-ray colorization system 104 may be implemented across one or more computing systems that may be referred to as the "cloud," although this is not required. X-ray colorization system 104 may receive data obtained and/or generated by robots 108 1-x and/or agricultural personnel and process it using various image processing techniques to perform tasks such as analyzing X-ray image data and/or colorizing the X-ray image data obtained or generated. In various implementations, X-ray colorization system 104 may include an X-ray data module 114 and an inference module 118. In some implementations one or more of modules 114 and 118 may be omitted, combined, and/or implemented in a component that is separate from X-ray colorization system 104.

X-ray colorization system 104 may also include one or more databases. For example, X-ray colorization system 104 may include, in communication with X-ray data module 114, an imagery database 116 for storing image data captured by, for instance, agricultural personnel and/or one or more robots 108 1-x. X-ray colorization system 104 may also include a machine learning model database 120 that includes one or more machine learning models that are trained using techniques described herein to colorize the usually monochrome (e.g., black and white) X-ray images obtained. In this specification, the term "database" and "index" will be used broadly to refer to any collection of data. The data of the database and/or the index does not need to be structured in any particular way and it can be stored on storage devices in one or more geographic locations.

The X-ray data module 114 may be configured to obtain monochrome X-ray data and/or other data from various sources, including robots 108 1-x. The X-ray data module 114 may then provide this monochrome X-ray image data to inference module 118. In other implementations, X-ray data module 114 may be omitted and the functions described herein as being performed by X-ray data module 114 may be performed by other components of X-ray colorization system 104, such as inference module 118.

Inference module 118 may be configured to apply the monochrome X-ray data received from X-ray data module 114 as input across various machine learning models stored in machine learning model database 120 to generate output. This output may be a colorized version of the X-ray received from X-ray data module 114. This colorized version may, for example, predict various visual features of an otherwise occluded melon, such as webbing, veins, seams, general coloration, etc. To this end, machine learning models stored in database 120 may be trained to detect, classify, and/or colorize portions of the X-ray image, such as those captured of agricultural area(s) 112 captured by agricultural personnel and/or by robot(s) 108.

In some implementations, the inference module 118 may be further configured to predict phenotypic trait(s) based on the colorized X-ray image. These predictions may, in addition to information from the colorized X-ray image, also consider a variety of other data points, for example one or more environmental features associated with an agricultural area where the plant(s) is grown.

Various types of machine learning models may be trained, e.g., using synthetic training data generated using techniques described herein, to detect, classify, and/or colorize portions of an X-ray image, as well as to detect/predict phenotypic trait(s) based on the colorized portions of the X-ray image. In some implementations, a convolutional neural network ("CNN") may be trained to generate output of colorized portions of the portions of the plants detected in the X-ray image. In FIG. 1, for instance, inference module 118 may apply a trained CNN to generate a colorized X-ray image 122. In some instances, inference module 118 may apply an additional machine learning model, such as another CNN, to add one or more pixel-wise annotations or bounding boxes identifying one or more selected features of the portion of the plant (e.g. seams, webbing, etc.).

In some implementations, one or more components of X-ray colorization system 104 may be implemented in whole or in part on a robot 108. For example, inference module 118 may be implemented in whole or in part on a robot 108 that is also equipped with an X-ray sensor. By having an onboard inference module 118, robot 108 may be able to process its own images to quickly colorize X-ray images.

As noted previously, obtaining sufficient ground truth training data to train machine learning model(s) such as CNNs to properly colorize an X-ray image may be resource-intensive and/or difficult. While images of the plants from above may be captured relatively easily, and thus more frequently, images capturing the portion of the plant below the canopy may not be as easily obtained, e.g., because they require either the removal of the canopy or manual movement of the canopy for imaging. Accordingly, techniques are described herein for using a generative adversarial network ("GAN") to train a generator model to generate colored X-ray images.

Figures 2A, 2B:
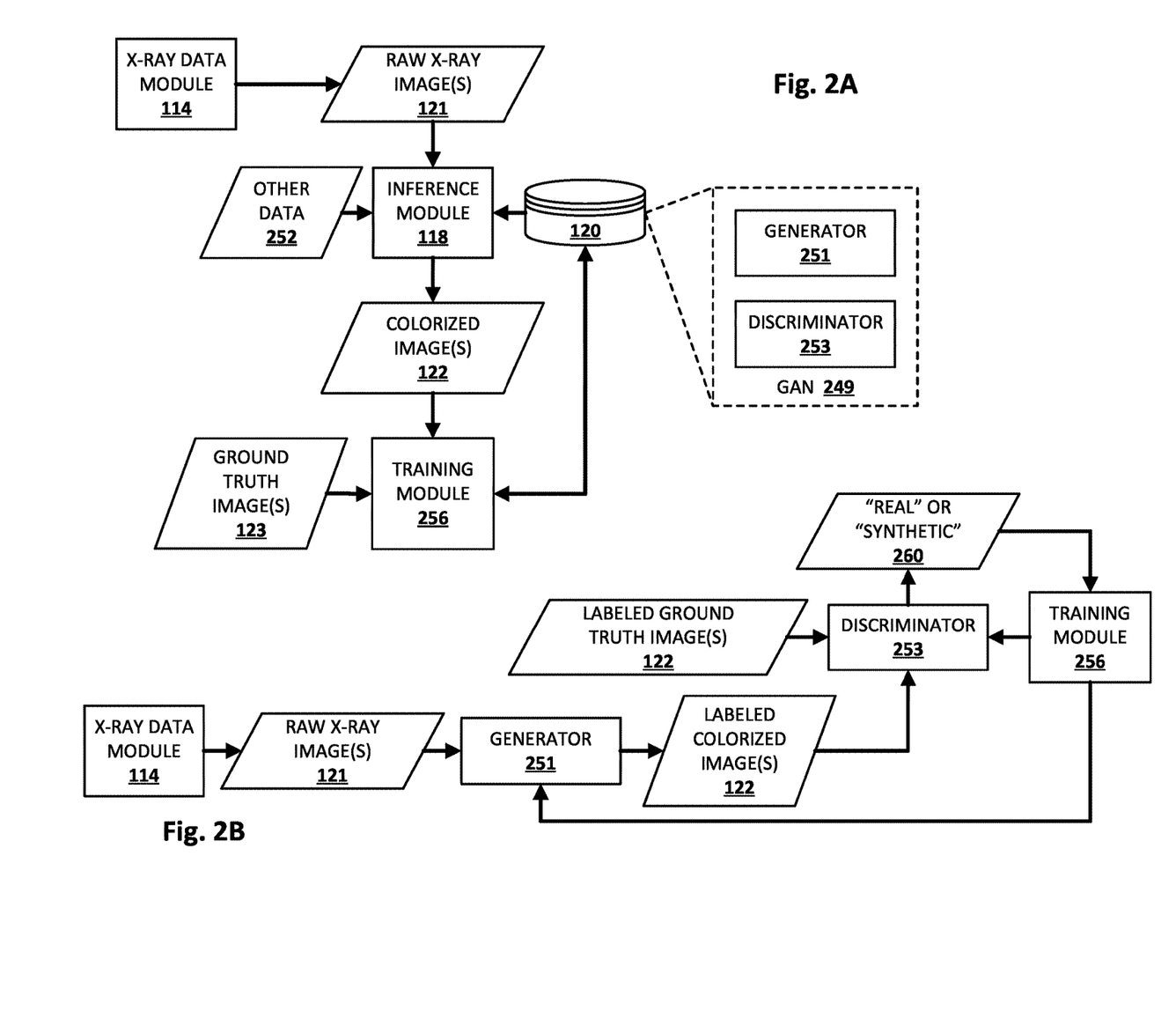
FIG. 2A and FIG. 2B schematically depict components and processes for practicing selected aspects of the present disclosure, in accordance with various implementations.

FIG. 2A depicts an example process flow for training one or more machine learning models to learn a mapping between "raw" monochrome X-ray image(s) 121 and corresponding non-occluded plant-parts-of-interest. In some implementations, this mapping may account for not only visual features of the plant-parts-of-interest (e.g., melons), but also for other visual features in the X-ray image, such as attributes of the canopy that remain visible in the X-ray image (e.g., leaf sizes/densities, leaf distributions, etc.). Suppose the machine learning model is trained on training data that includes a large number of X-ray images having healthy-appearing canopies, paired with ground truth color images of unobstructed plant-parts-of-interest that also appear healthy. This training may result in the machine learning model subsequently being usable to map unpaired X-ray images depicting healthy canopies to (e.g., generate) colorized synthetic images with healthy-appearing plant-parts-of-interest. Likewise, paired training data depicting unhealthy canopies and unhealthy plant-parts-of-interest may result in the machine learning model subsequently being usable to map unpaired X-ray imagery depicting unhealthy canopies to (e.g., generate) colorized synthetic images with unhealthy-appearing plant-parts-of-interest. Once trained, these machine learning models and the mapping they represent may be applied to X-ray images 121 to generate colorized versions 122 of those X-ray images 121. Other process flows that differ from that depicted in FIG. 2 are contemplated.

Starting at top left, X-ray module 114 may provide raw X-ray image(s) 121 to inference module 118. As part of the training process, some of these raw X-ray images 121 may be paired with ground truth images 123 that depict the same crops with the canopies removed or at least moved out of the way. In various implementations, ground truth images 123 may be in the same form as the targeted image domain. Accordingly, in some implementations, ground truth images 123 may take the form of RGB digital images, because the ultimate goal may be to generate, as colorized images 122, "synthetic" RGB images from raw X-ray images 121.

Inference module 118 may process raw X-ray image(s) 121 based on one or more machine learning models stored in database 120 to generate colorized image(s) 122. As noted previously, these machine learning model(s) may take various forms, such as various types of CNNs. In some implementations, other data 252 may be applied as input across the machine learning model(s), in addition to raw X-ray images 121 in order to generate colorized X-ray images. Other data 252 may include, for instance, environmental features associated with an agricultural area where the plant(s) is grown, such as temperature, precipitation, sunlight exposure, fertilizer application, soil composition, pH levels, existing vegetation density in the area, or pesticide/herbicide application, to name a few. Where applicable, these environmental features may also include time-series data corresponding to the environmental condition(s).

In some implementations, other data 252 may also include information about a spatial relationship between the X-ray sensor that captured X-ray images 121 and the plants depicted in those images. Depth data, for instance, may indicate a distance between the X-ray sensor and the plants. This distance may impact, for instance, perceived sizes of plant-parts-of-interest that are captured in the X-ray imagery. If the X-ray sensor is farther away from the plants, the plant-parts-of-interest may appear smaller (e.g., occupy less of the X-ray sensor's field of view), whereas if the X-ray sensor is closer to the plants, the plant-parts-of-interest may appear larger (e.g., occupy more of the X-ray sensor's field of view). Accounting for depth in this manner allows for the sizes of plant-part-of-interest to be accounted for in making predictions. Other information about the spatial relationship between the X-ray sensor that captured X-ray images 121 and the plants depicted in those images that can also be captured during training (and therefore, applied during inference) may include, for instance, a camera angle of the X-ray sensor, intrinsic settings of the X-ray sensor, etc.

Colorized image(s) 122 may then be analyzed by a training module 256 (which may or may not be part of X-ray colorization system 104) in order to train one or more of the machine learning models that were applied by inference module 118. Training module 256 may employ various types of training, depending on factors such as what training data is available. For example, where at least some ground truth image(s) 123 are paired with at least some raw X-ray image(s) 121, training module 256 may use supervised training to train the machine learning model(s). For example, training module 256 may compare colorized image(s) 122 generated by inference module 118 with ground truth image(s) 123 to determine differences, or "errors," between the two. These errors may then be used by training module 256 to train the machine learning model(s) in database 120, e.g., using techniques such as back propagation and/or gradient descent.

As noted previously, obtaining paired ground truth images 123 of non-occluded plant-parts-of-interest may be cumbersome. The canopy that occludes these parts must be removed or at least moved out of the way, which can be a laborious and/or time-consuming process. Accordingly, in some implementations, training module 256 may employ other techniques, such as semi-supervised or unsupervised learning, to train one or more machine learning models in database 120. To this end, in some implementations, database 120 may include a GAN 249 that itself includes at least one generator machine learning model 251 (hereinafter referred to as a "generator") and at least one discriminator machine learning model 253 (hereinafter referred to as a "discriminator"). Generator 251 and discriminator 253 may take various forms, such as CNNs or other types of neural networks. Generator 251 in particular may function as an "X-ray to color" generator machine learning model that is applied by inference module 118 to raw X-ray image(s) 121 to generate colorized image(s) 122.

FIG. 2B depicts an example of how generator 251 and discriminator 253 may be trained. Although generator 251 and discriminator 253 are technically machine learning models that are applied by inference module 118, for the sake of simplicity and clarity, inference module 118 has been omitted from FIG. 2B. X-ray data module 114 may provide raw X-ray image(s) 121 to generator 251. Generator 251 may use this data to generate labeled colorized image(s) 122. These images 122 are referred to as "labeled" because they are annotated or otherwise signaled as being "synthetic," for training purposes.

Other training techniques are contemplated. For example, in some implementations, GAN 249 may be a CycleGAN that includes an additional generator and discriminator pair that are mirror images of generator 251 and discriminator 253. For example, the additional generator may be trained to map color images to the X-ray domain. The additional discriminator may be trained to process color images and generate output that predicts whether those color images are "real" or "synthetic."

Referring back to FIG. 2B, the labeled colorized image(s) 122 are then processed by (or using) discriminator 253 to generate output 260 of "real" or "synthetic." Meanwhile, labeled ground truth images 123 may also be processed by (or using) discriminator 253 to generate output 260. Output 260 may then be used by training module 256 to train discriminator 253 and/or generator 251. For example, when discriminator 253 correctly classifies a labeled colorized image 122 as "synthetic," that means generator 251 was unable to "fool" discriminator 253. Training module 256 may train generator 251 accordingly. As another example, when discriminator 253 incorrectly labels a labeled colorized image 122 as "real," that means generator 251 has "fooled" discriminator 253. Training module 256 may train discriminator 253 accordingly. In some implementations, if generator 251 is able to "fool" discriminator 253 some threshold number or percentage of times, generator 251 may be deemed sufficiently trained to generate realistic colorized images from raw X-ray imagery.

Figure 3:
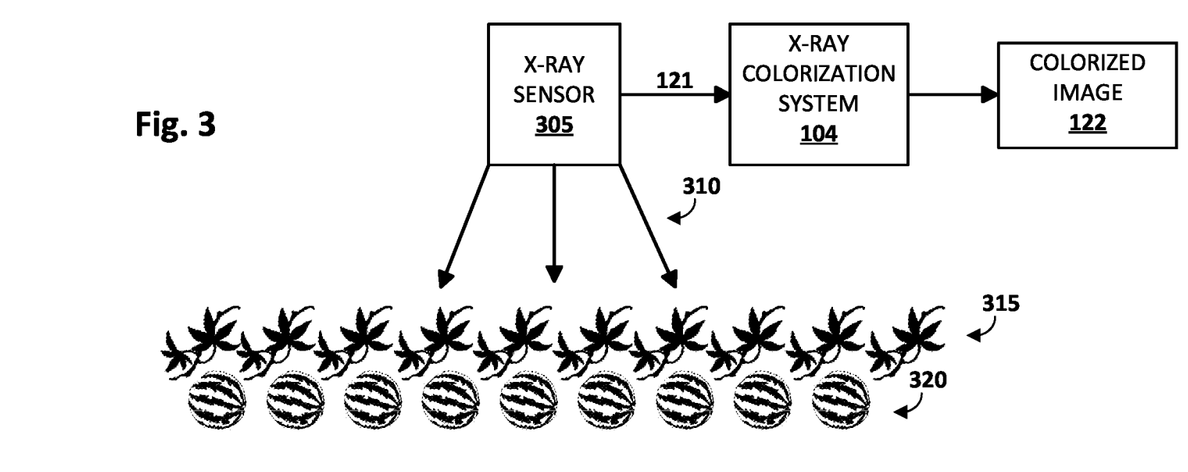
FIG. 3 depicts an exemplary system for colorizing one or more X-ray images of a melon plant, in accordance with various implementations.
Figure 4:
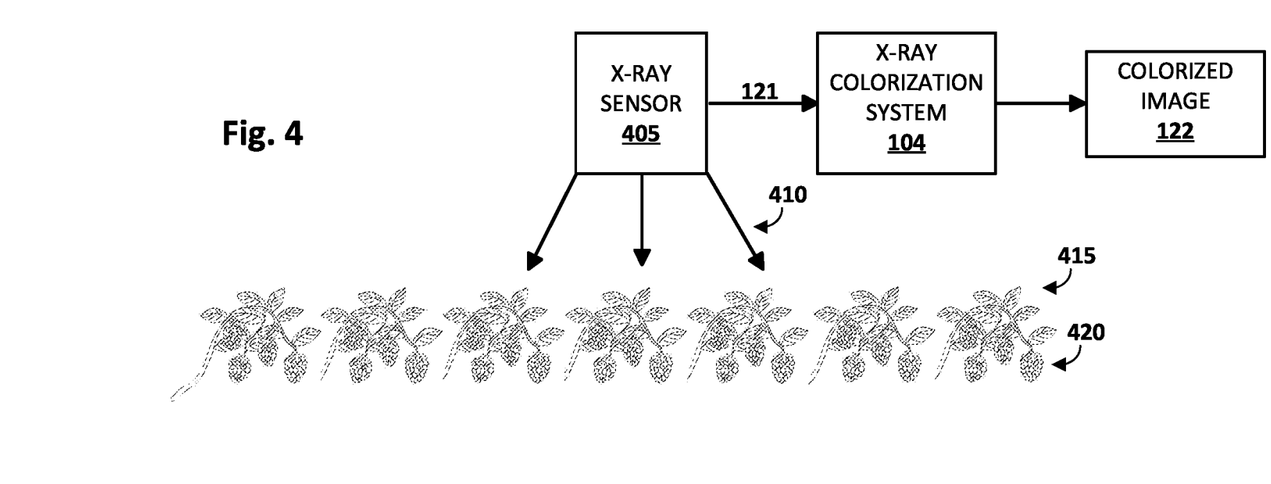
FIG. 4 depicts an exemplary system for colorizing one or more X-ray images of a berry plant, in accordance with various implementations.

FIGS. 3 and 4 depict simplistic examples of how X-ray images may be taken by an X-ray sensor 305, 405 and processed by X-ray colorization system 104 to generate colorized X-ray images 122 from raw X-ray images 121. In the example of FIG. 3, the crops at issue are watermelon plants, but this is not meant to be limiting. Similar techniques may be applied to other types of crops, such as other melons, papaya, various berries (e.g. raspberries illustrated in FIG. 4), etc. An X-ray sensor 305 may be configured to capture an X-ray image 122. X-ray sensor 305 may, for instance, be incorporated into any of the robots $108_{1-X}$ described with reference to FIG. 1 or mounted to other agricultural vehicles. The X-ray image 121 may capture the leaf canopy 315 of the plant that at least partially occludes or obstructs the view of one or more watermelons 320, which may be visible through the canopy 315 in the X-ray image. Once the X-ray image 122 is captured, it may be transmitted to X-ray colorization system 104, where the X-ray image may be processed by inference module 118 (not depicted in FIG. 3, see previous figures) using one or more machine learning models as described herein to generate colorized X-ray image 122.

In some implementations, colorized image 122 may be viewed manually, e.g., by a grower, so that the grower can use their own knowledge and expertise to make decisions such as whether to harvest the watermelons 320, or whether chemical application and/or irrigation needs to be modified. In other implementations, colorized image 122 may be processed, e.g., by inference module 118 in a similar fashion to un-occluded images of watermelons, to detect (and annotate in many cases) phenotypic traits, such seam dimensions and/or spacing, color, moisture content, measure of ripeness, presences of disease, etc.

FIG. 4, very similar to FIG. 3, illustrates another example of how X-ray images may be taken and processed to generate colorized images. In contrast to FIG. 3, in FIG. 4, the crops at issue are raspberry plants. As with FIG. 3, an X-ray sensor 405 captures an x-ray image of the leaf canopy 415 of the plant that at least partially occludes or obstructs the view of one or more raspberries 420, which may be visible through the canopy 415 in the X-ray image. Once the X-ray image is captured, the image data may be transmitted to X-ray colorization system 104, where the X-ray image may be processed using a machine learning model, as outlined in detail herein (e.g. with reference to FIGS. 2 and 5), after which a colorized X-ray image 122 results. As before, this colorized image 122 may be analyzed, e.g., manually by a grower or automatically by inference module 118 using one or more machine learning models, to detect phenotypic trait(s) of the raspberries 420.

Figure 5:
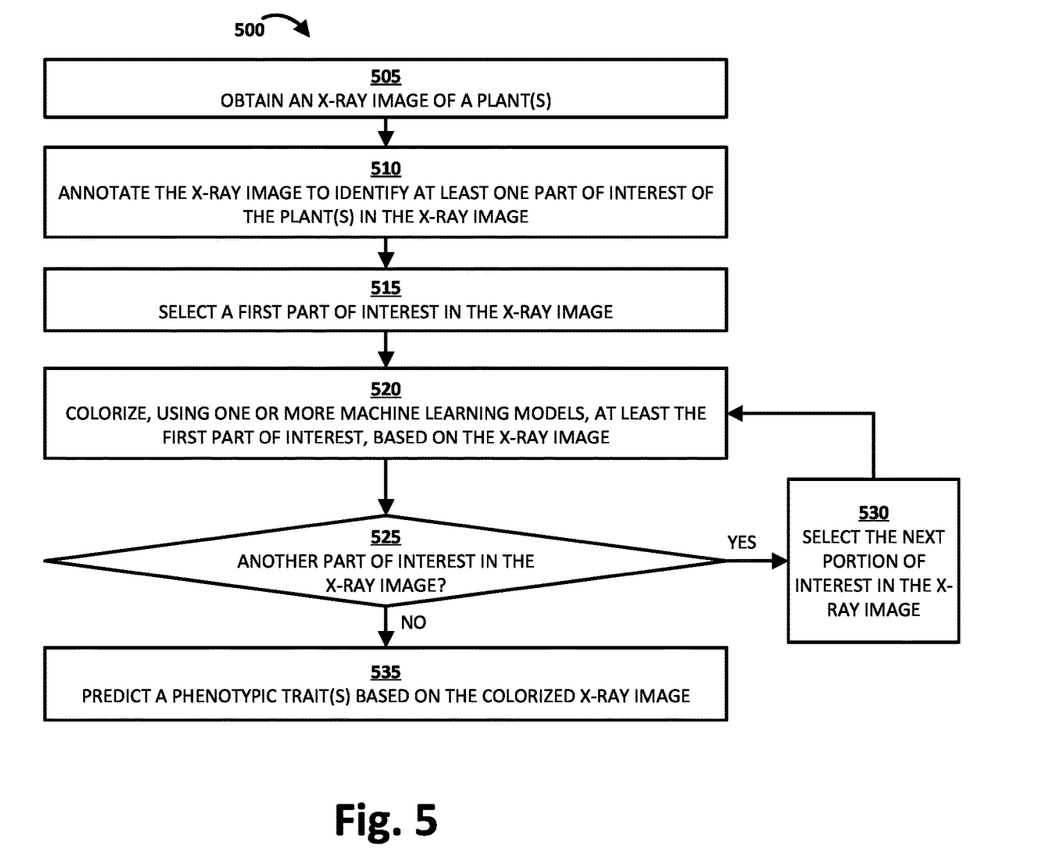
FIG. 5 is a flowchart of an example method in accordance with various implementations described herein.

FIG. 5 illustrates a flowchart of an example method 500 for practicing selected aspects of the present disclosure. The operations of FIG. 5 can be performed by one or more processors, such as one or more processors of the various computing devices/systems described herein, such as by X-ray colorization system 104. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 505, the system, e.g., by way of X-ray data module 114, may obtain an X-ray image of one or more plants, including one or more parts-of-interest of the plant(s). As described herein, these parts of interest may be portions of the plant at least partially obscured by the leaf canopy, for example the fruiting bodies of these plants (e.g. melons, in particular watermelons, raspberries, etc.). In some implementations, the X-ray image may be obtained by a robot 108, and may depict one or more parts of interest of the plant(s).

As illustrated in FIG. 5 at block 510, in some instances, the image may be annotated, e.g., with bounding boxes (or pixel-wise annotations), to identify these parts of interest; however, this is not intended to be limiting as the entire X-ray may also be processed without annotation (in which case blocks 515 and 525-530 may be omitted). Where annotated, a first portion of interest, e.g., within a bounding box that surrounds a detected plant-part-of-interest, may be selected, at block 515. The selected part of interest, if the image is annotated, or the entire X-ray image may be colorized, at block 520.

At block 520, a trained machine learning model (trained as described herein), such as generator 251, may be applied by inference module 118 to the X-ray image (or annotated portion thereof). In some cases where the machine learning model was trained using other data 252 (e.g., environmental data, stewardship data, spatial relationship of X-ray sensor to plants, etc.) other data 252 may also be applied by inference module 118 as input across the machine learning model. In some implementations, visual features of the canopy (e.g., density of leaves, shade, number of leaves, average leaf size, etc.) may also be considered when generating colorized image 122 (and/or when making phenotypic predictions at block 535). For example, to the extent leaves of the canopy are at least partially discernable in X-ray image 121, visual features of those leaves may be used (along with visual features about plant-parts-of-interest such as melons) to generate colorized image 122. For instance, a measure of density of leaves in a canopy may correlate with melons having certain phenotypic trait(s), such as seam sizes/distributions, ripeness, etc. For example, large amounts of densely-distributed leaves may suggest a health melon plant, and hence, healthy melons.

Based on this application, inference module 118 may generate output that includes a colorized X-ray image. Where the image was annotated with portions of interest (block 510), the process may be repeated (e.g. at blocks 525 and 530) until such a time as all parts-of-interest of the image have been processed and colorized as colorized image 122.

Once colorized, one or more phenotypic traits may be predicted based on the colorized X-ray image, at block 535. As noted previously, this prediction may be performed in various ways. In some instances, a phenotype expert such as a grower may examine colorized image 122 manually to identify and/or measure phenotypic trait(s). Additionally or alternatively, in some implementations, inference module 118 may apply one or more machine learning models (e.g., CNNs other than generator 251) to colorized image 122 to detect (and in some cases, annotate) phenotypic traits. With watermelons, these phenotypic traits may include, for instance, color, texture, spatial dimensions of seams, space between seams, etc.

In addition to information from the colorized X-ray image, predicting a phenotypic trait(s) at block 535 may also consider a variety of other data points. One example is other data 252, which may include, for instance, one or more environmental features associated with an agricultural area where the plant(s) is grown, may be considered when predicting the phenotypic trait(s) of the plant. These environmental conditions may include, for instance, temperature, precipitation, sunlight exposure, fertilizer application, soil composition, pH levels, existing vegetation density in the area, or pesticide/herbicide application, to name a few. In some implementations, an inference module (for example inference model 118 described with reference to FIGS. 1 and 2) may facilitate the generation of the colorized X-ray, and may also obtain other data (e.g. environmental data), to make sure predictions regarding the phenotypic trait(s) of the plant(s).

Figure 6:
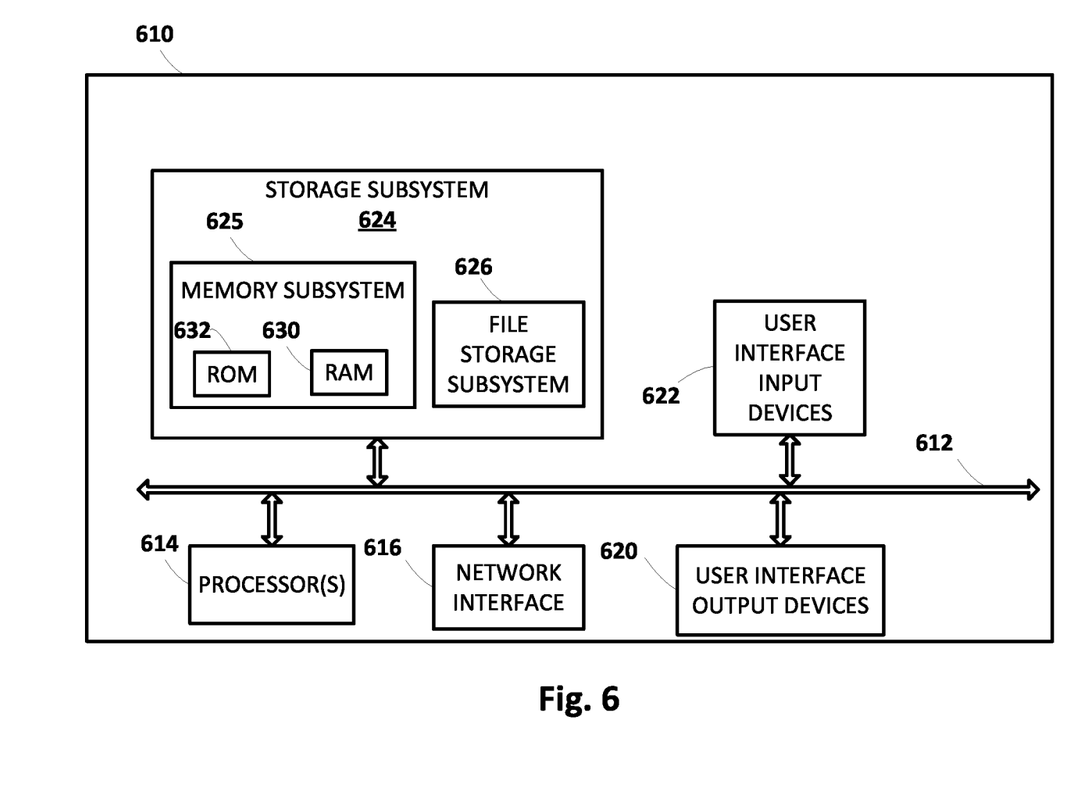
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of an HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of an HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, the method comprising:
    obtaining a monochrome X-ray image that depicts a plant, wherein a canopy of the plant at least partially occludes one or more plant-parts-of-interest from a vantage point at which an X-ray sensor captured the monochrome X-ray image, and wherein the one or more plant-parts-of-interest are visible through the canopy in the monochrome X-ray image;

obtaining environmental data of an agricultural area where the plant is grown, wherein the environmental data is obtained using one or more of a moisture sensor, a laser, a barometer, a photodiode, or a thermometer;

obtaining time-series data corresponding to the environmental data of the agricultural area where the plant is grown;

executing a machine learning model to generate a Red Green Blue (RGB) version of the X-ray image, wherein the monochrome X-ray image, the environmental data of the agricultural area where the plant is grown, and the time-series data are inputs to the machine learning model; and predicting one or more phenotypic traits of the one or more plant-parts-of-interest based on one or more visual features of the RGB version of the X-ray image.

2. The method of claim 1, wherein the machine learning model comprises a generator model of a generative adversarial network that also includes a discriminator model.

3. The method of claim 1, wherein the environmental data of the agricultural area in which the plant is grown includes one or more of temperature, precipitation, sunlight exposure, fertilizer application, soil composition, pH levels, or pesticide application.

4. The method of claim 1, wherein the plant comprises a melon plant with one or more melons, and the one or more visual features comprise one or more spatial dimensions of seams of the one or more melons.

5. The method of claim 1, wherein the one or more plant-parts-of-interest include a berry portion of a berry plant.

6. The method of claim 1, wherein predicting the one or more phenotypic traits is further based on one or more visual features of the canopy depicted in the X-ray image.

7. A system comprising one or more processors and memory storing instructions that, in response to execution of the instructions by the one or more processors, cause the one or more processors to:

obtain a monochrome X-ray image that depicts a plant, wherein a canopy of the plant at least partially occludes one or more plant-parts-of-interest from a vantage point at which an X-ray sensor captured the monochrome X-ray image, and wherein the one or more plant-parts-of-interest are visible through the canopy in the monochrome X-ray image;

obtain environmental data of an agricultural area where the plant is grown, wherein the environmental data is obtained using one or more of a moisture sensor, a laser, a barometer, a photodiode, or a thermometer;

obtain time-series data corresponding to the environmental data of the agricultural area where the plant is grown;

execute a machine learning model to generate a Red Green Blue (RGB) version of the X-ray image, wherein the monochrome X-ray image, the environmental data of the agricultural area where the plant is grown, and the time-series data are inputs to the machine learning model; and predict one or more phenotypic traits of the one or more plant-parts-of-interest based on one or more visual features of the RGB version of the X-ray image.

8. The system of claim 7, wherein the machine learning model comprises a generator model of a generative adversarial network that also includes a discriminator model.

9. The system of claim 7, wherein the environmental data of the agricultural area in which the plant is grown includes one or more of temperature, precipitation, sunlight exposure, fertilizer application, soil composition, pH levels, or pesticide application.

10. The system of claim 7, wherein the plant comprises a melon plant with one or more melons, and the one or more visual features comprise one or more spatial dimensions of seams of the one or more melons.

11. The system of claim 7, wherein the one or more plant-parts-of-interest include a berry portion of a berry plant.

12. The system of claim 7, the one or more phenotypic traits are further predicted based on one or more visual features of the canopy depicted in the X-ray image.

* * * * *